United States Patent [19]

Dudek

[11] 4,214,343
[45] Jul. 29, 1980

[54] ARM ADAPTOR FOR HOOK-TYPE BLADE

[75] Inventor: Dennis A. Dudek, Dyer, Ind.

[73] Assignee: The Anderson Company of Indiana, Gary, Ind.

[21] Appl. No.: 14,072

[22] Filed: Feb. 22, 1979

[51] Int. Cl.² .............................. A47L 1/00; B60S 1/02
[52] U.S. Cl. ................................ 15/250.32; 15/250.42
[58] Field of Search .......................... 15/250.32–250.42

[56] References Cited

U.S. PATENT DOCUMENTS

| 3,588,941 | 6/1971  | Schlesinger     | 15/250.32 |
|-----------|---------|-----------------|-----------|
| 3,843,994 | 10/1974 | Smithers        | 15/250.32 |
| 3,874,019 | 4/1975  | Speth           | 15/250.32 |
| 3,896,519 | 7/1975  | Pankow          | 15/250.32 |
| 3,919,735 | 11/1975 | Arman           | 15/250.32 |
| 4,057,869 | 11/1977 | Longman et al.  | 15/250.32 |
| 4,142,268 | 3/1979  | Brown et al.    | 15/250.32 |

FOREIGN PATENT DOCUMENTS

| 2310374 | 9/1974 | Fed. Rep. of Germany | 15/250.32 |
| 2701350 | 3/1978 | Fed. Rep. of Germany | 15/250.32 |
| 1100069 | 1/1968 | United Kingdom | 15/250.32 |
| 1232157 | 5/1971 | United Kingdom | 15/250.32 |

Primary Examiner—Leonard D. Christian
Attorney, Agent, or Firm—Wegner, Stellman, McCord, Wiles & Wood

[57] ABSTRACT

An improved adaptor is provided for connecting a hook-end wiper arm to a pin-type connector on a wiper blade. The adaptor includes a double-ended pin with one end being removably insertable in a pin-type connector of the wiper blade and with the other end of the pin being gripped by a U-shaped leaf spring or a U-shaped plastic body. The U-shaped spring and U-shaped plastic body have lugs for engaging in an aperture in the end portion of a hook-end wiper arm to removably retain the arm on the adaptor.

6 Claims, 6 Drawing Figures

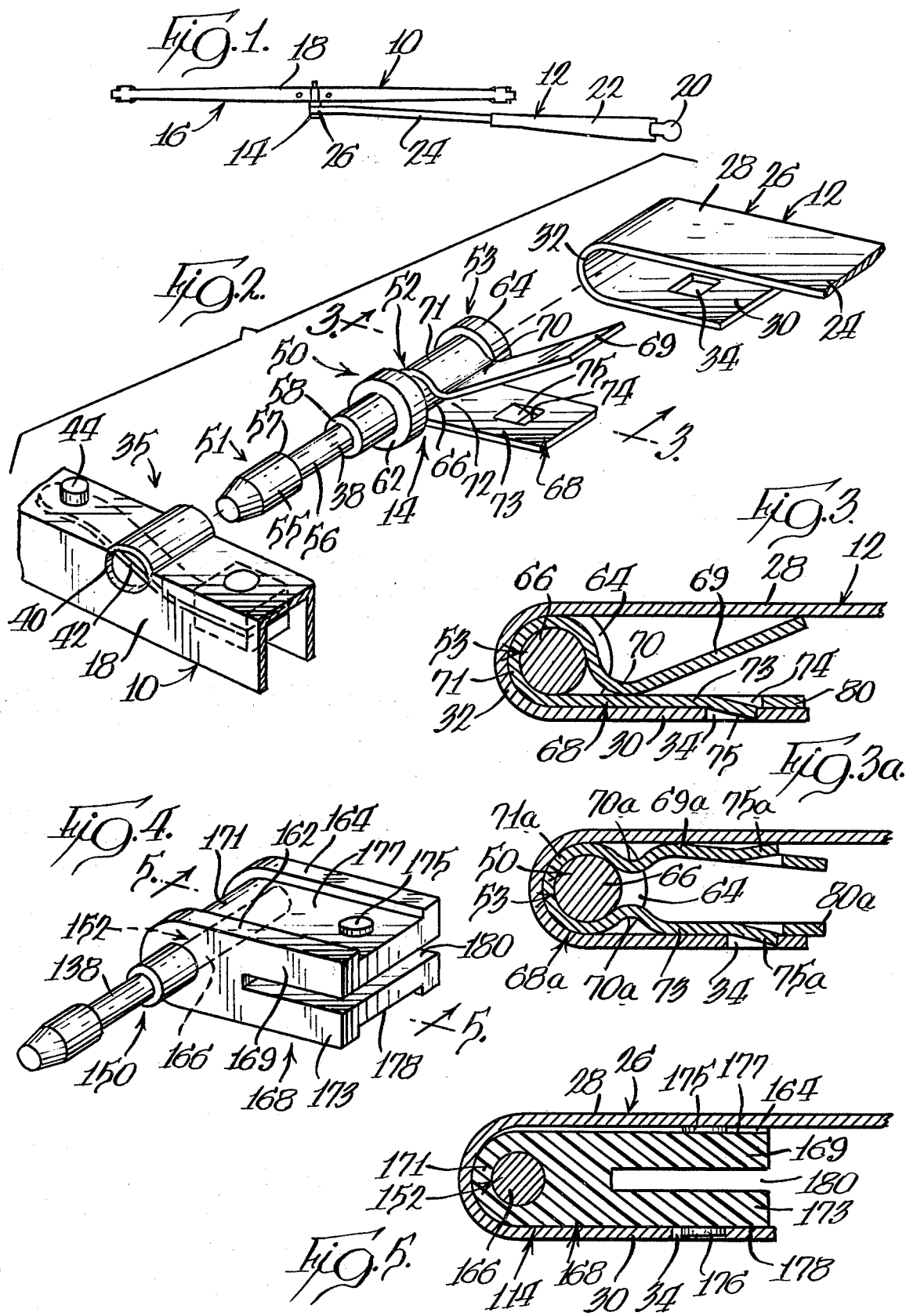

ARM ADAPTOR FOR HOOK-TYPE BLADE

BACKGROUND OF THE INVENTION

1. Field of the Invention

This invention relates to windshield wiper arms and blades and, more particularly, to an adaptor for connecting a U-shaped wiper arm to a pin-type connector on a wiper blade.

2. Description of the Prior Art

Adaptors for converting one type end of a windshield wiper arm to another type end have been broadly known for some time. Typical of the known type adaptors would be that shown in U.S. Pat. No. 3,588,942 to F. J. Schlesinger and U.S. Pat. No. 3,874,019 to P. J. Speth wherein adaptors are provided for converting a straight end wiper arm to a pin-type wiper arm whereby the straight end arm can be connected to a pin-type connector on a blade. The adaptors of the above-mentioned U.S. Pat. Nos. 3,588,942 and 3,874,019 could not be used with a hook end arm to connect the hook end arm to a pin-type connector on a blade.

Another example of an adaptor is shown in U.S. Pat. No. 3,843,994 to P. G. K. Smithers wherein an adaptor is provided for converting a hook end arm to a pin-type arm whereby the hook end arm can be connected to a pin-type connector on a blade. The adaptor includes a horizontally U-shaped sheet metal member with the legs of the "U" lying parallel to each other and being spaced apart substantially the same distance as the width of the hook end arm. A pair of detents extend inward from each leg of the "U" of the adaptor. A cylindrical spacer supports the legs apart near the base of the "U" and a pin passes transversely to the plane of the legs of the "U" and through the spacer. The hook end arm extends around the spacer and pin and between the legs of the "U" with the detents retaining the arm against rotation relative to the pin. In practice, it has been found that the legs of the "U" of the adaptor spread, releasing the arm, thereby permitting rotation of the arm relative to the adaptor so that control of the blade is lost.

U.S. Pat. No. 3,896,519 to H. G. Pankow and U.S. Pat. No. 4,057,869 to R. A. Longman et al, both show connectors directly on blades that are adapted to connect a hook end arm (U.S. Pat. No. 3,896,519) to a blade or to connect both a hook end arm and a straight end arm (U.S. Pat. No. 4,057,869) to a blade. Both the U.S. Pat. Nos. 3,896,519 and 4,057,869 patents show different specific structures for connecting a particular arm end to a blade. In both cases, the designs of the connectors leave something to be desired in practicality, i.e. the spring can become lost in the U.S. Pat. No. 3,896,519 structure and the onepiece plastic configuration of the U.S. Pat. No. 4,057,869 structure is subject to failure and cannot be used with a side pin-type connector on a blade.

SUMMARY OF THE INVENTION

To overcome the problems associated with existing adaptors for converting one type arm end for connection to a crosspin or side pin-type connection on a blade, my improved adaptor is provided with a double-ended crosspin to one end of which is securely attached a U-shaped member having an element for coacting with a part of a hook end wiper arm whereby the arm is positively and securely attached to the adaptor.

The adaptor has either a U-shaped spring rotatably secured to the arm attaching end of the pin or a U-shaped body member affixed to said arm attaching end of the pin such that the hook end arm engages with the U-shaped spring or the U-shaped body member and is retained in said engagement by a lug on the adaptor engaging in an opening or aperture in the hook end of the arm.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a plan view of a windshield wiper arm connected to a windshield wiper blade using my improved adaptor;

FIG. 2 is an exploded perspective view of a hook end wiper arm, one preferred version of my improved adaptor, and a pin-type connection on a wiper blade;

FIG. 3 is a cross-sectional view taken along the line 3—3 of FIG. 2;

FIG. 3a is a cross-sectional view similar to FIG. 3 only showing a modified form of spring;

FIG. 4 is a perspective view of another preferred version of my adaptor; and

FIG. 5 is a cross-sectional view taken along the line 5—5 of FIG. 4.

DESCRIPTION OF THE PREFERRED EMBODIMENT

Referring to the drawings, and in particular FIGS. 1–3 thereof, a windshield wiper blade 10 is shown connected to one end of a windshield wiper arm 12 by means of my improved adaptor 14. The wiper blade 10 is a conventional blade and is comprised of a resilient wiping element (not shown) in wiping contact with a windshield and a superstructure 16 which has, at least, a primary yoke 18 which receives pressure from the windshield wiper arm 12 and transmits said pressure to the resilient wiping element. The wiper arm 12 is a conventional arm having a shaft-engaging head 20, a channel 22 encasing a spring member (not shown), and an extension 24. The extension 24 has a hook-shaped end 26 which includes a planar portion 28 formed as a continuation of extension 24 and an end portion 30 lying parallel to the planar portion 28 and being connected thereto by a crook or curved portion 32. The hook-shaped end 26 has an opening or aperture 34 formed either in the planar portion 28 or in the end portion 30. As shown, the opening 34 is in the end portion 30.

The wiper blade 10 is any currently available wiper blade, such as a triple yoke-type blade of the type shown and described in the basic U.S. Pat. No. 2,596,063 to John W. Anderson. In the present case, the primary yoke 18 of the wiper blade 10 has a side pin connector 35 which is designed to receive a side pin or crosspin 38 of adaptor 14. The connector 35 is comprised of a pair of aligned openings 40 in the side walls of the yoke 18 with a spring retainer 42 anchored in the yoke 18 and intersecting the passage between said openings 40. A push button 44 projects through the superstructure 16 and is operatively connected to the spring retainer 42 so that depressing the button 44 will move the spring retainer 42 out of alignment with the openings 40 so that the pin 38 of the adaptor 14 can be retracted from the passage between the openings 40 to disconnect the blade 10 from the arm 12. The side pin connector 35 is a conventional connector, one such being shown and described in U.S. Pat. No. 3,866,259 in the name of Elton F. Nichols et al and entitled "Windshield Wiper Blade Connector".

The adaptor 14 of my invention is comprised of a double-ended pin 50 which has the side pin 38 on one end portion 51 and has an attaching pin 52 on the other end portion 53. The side pin 38 has an enlarged tapered end 55 and a recessed part or groove 56 bounded on each end by shoulders 57,58. In use, the spring 42 of the connector 35 on the wiper blade 10 seats in the recessed part 56 to retain the pin 50 attached to the blade 10.

The attaching pin 52 on the other end portion 53 of the side pin 50 has, as shown in FIG. 2, a pair of enlarged, spaced apart collars 62,64 between which is a reduced diametered portion 66. A U-shaped spring clip 38 is disposed around the portion 66 of the attaching pin 52 between the collars 62,64 and is free to rotate relative to the side pin 50. The one leg 69 of the U-shaped clip 68 is crimped or bent downwardly at 70 around the portion 66 of the pin 52 so that the midportion 71 of the clip 68 conforms generally to the shape of the reduced diametered portion 66. A gap 72 is provided between the crimp 70 in leg 69 and the leg 73, which is less than the diameter of the portion 66, so as to retain the clip 68 on the attaching pin 52. The leg 73 of the clip 68 has an opening or aperture 74 at an appropriate location therein with a tab 75 struck therefrom. The downturned edge of the tab 75 extends below the plane of the leg 73 to act as a restraint for a purpose to be described hereinafter.

The wiper arm 12 is connected to the adaptor 14 by aligning the opening 34 between the planar portion 28 and the end portion 30 of the hook end 26 with the midportion 71 of the clip 68. The hook end 26 of the arm 12 and the clip 68 are telescoped together to compress the legs 69,73 of the clip 68 until the bent portion 70 contacts or substantially contacts the leg 73 and the tab 75 seats in the aperture 34 in the end portion 30 as the end of the leg 69 bears against the undersurface of the portion 28 of the arm. The adaptor 14 is now connected to the hook end 26 of the arm 12 so that the arm 12 is, to all intents and purposes, a side pin-type arm. The pin 38 of the side pin 50 is insertable in the connector 35 on the blade for operation. The arm is disconnected from the blade by depressing button 44 which depresses spring 42 to release the side pin 38 of the adaptor 14. The adaptor 14 and arm 12 are moved sidewardly relative to the blade to remove the blade from the arm. To remove the adaptor 14 from the arm 12, a tool, such as the blade of a screwdriver, is inserted beneath leg 73 to lift the tab 75 from the opening 34 whereupon the arm 12 and adaptor 14 are moved relative to each other to disconnect the adaptor 14 from the arm 12. It is possible to extend the end 80 of the leg 73 of the clip 68 beyond the portion 30 of the arm end whereupon depressing the end 80 and leg 73 toward leg 69 will unlatch the tab 75 from opening 34 so that the arm can be removed from the adaptor.

FIG. 3a shows a modified form of spring clip 68a which fits between the collars 62,64 on the attaching pin 52 of pin 50 and around the reduced diametered portion 66. The clip 68a is free to rotate relative to the side pin 50. Each leg 69a and 73a is crimped or bent at 70a inwardly toward each other so as to create a midportion 71a of the clip which conforms to the shape of the portion 66 of the pin 50 throughout a major portion of the circumference of the portion 66 of said pin 50. In the unassembled state, the legs 69a and 73a diverge outwardly from the crimped portions 70a so that the ends of the legs are spaced apart a distance greater than the spacing between the legs of the hook-shaped end 26 of the wiper arm 12. Each leg 69a and 73a has an outwardly projecting struck portion or tab 75a which extends beyond the plane of the leg 69a or 73a. One leg, either 69a or 73a, will engage with the end portion 30 of the arm 12 with the tab 75a in the opening 34 in said portion 30. The tab 75a in arm 69a will engage the underside of the arm 12 to further secure the arm relative to the adaptor. With this construction of the spring clip 68a, the blade can be used interchangeably with arms extending either from the left or from the right.

The arm 12 is engaged with the adaptor 14 having a spring clip 68a in the same manner as described with respect to clip 68. The clip 68a can be removed from the arm by depressing the overhanging end 80a of the leg 73a to disengage the tab 75a from opening 34 whereupon the arm can be removed from the adaptor by moving the arm relative to the adaptor.

A modified form of my invention is shown in FIGS. 4 and 5, wherein an adaptor 114 has a pin 150 with a side pin 138 and an attaching pin 152. The attaching pin 152 has a reduced diameter portion 166. The side pin 138 is substantially the same as side pin 38 of the embodiment of FIGS. 1–3. A molded plastic U-shaped member 168 is molded or cemented in place on the attaching pin 152 with the curved end portion 171 of the member 168 seating in the reduced diameter portion 166 of said pin 152. The member 168 has raised edge portions 162,164 on either side thereof, which portions 162,164 are spaced apart a distance equal to the width of the hook end 26 of the wiper arm 12. A pair of oppositely facing lugs 175,176 are formed on the flat midportions 177,178 of the legs 169,173, respectively, of the U-shaped member 168. A slot or cutout 180 lies between the legs 169,173 which permits the legs 169,173 to flex toward each other under pressure.

The wiper arm 12 has the hook end 26 aligned with the curved end portion 171 of the U-shaped member 168 of the adaptor 114 whereupon pressing the adaptor 114 into the crook or curved portion 32 of the hook end 26 of the arm 12 will seat the planar portion 28 and end portion 30 of the arm 12 in the space between the raised edge portions 162,164. The lug 176 will be urged into the opening 34 in the end portion 30 with the lug 175 bearing against the undersurface of the planar portion 28 of the arm 12. The side pin 138 of the adaptor 114 can now be inserted in the connector 35 on the wiper blade 10 whereupon the hook end arm 12 is operatively connected to a side pin-type blade 10. To remove the arm 12 from the blade 10, the button 44 is depressed and the side pin 138 is retracted sideways from the blade. To remove the adaptor 114 from the arm 12, a tool, such as the blade of a screwdriver, is inserted between the end portion 30 of the arm 12 and the leg 173 of the U-shaped member 168, whereupon the leg 173 is lifted relative to the portion 30 until the lug 176 clears the walls of the opening 34 in the arm. The adaptor 114 is now moved axially of the arm 12 until the U-shaped member clears the arm. The adaptor 114 and arm 12 are now separated.

I claim:

1. An adaptor for connecting a windshield wiper arm to a windshield wiper blade wherein the wiper arm has an end that is hook-shaped with the hook being formed by an end portion of the arm being bent back to lie parallel to said arm, said adaptor comprising a double-ended pin, a U-shaped member having a center portion and a pair of legs, said center portion of the "U" being secured onto one end portion of said pin, said legs having outer end portions spaced apart a greater distance than said end portion of the hook is spaced from said arm, a lug on at least one leg of said U-shaped member being adapted to seat in a recess in one portion of the hook end of the arm, the other end portion of said double-ended pin having a recess around the outer periphery thereof whereby said other end portion of the pin may be inserted in aligned openings in a blade and a spring on the blade seats in said recess to retain the pin from the adaptor and the arm assembled with the blade.

2. An adaptor as claimed in claim 1 wherein said U-shaped member is a flat spring bent into a "U" shape with at least one leg being crimped at said pin to retain said spring on said pin.

3. An adaptor as claimed in claim 2 wherein one leg of the U-shaped member diverges upwardly from said crimp and said lug is formed on said other leg of said U-shaped member.

4. An adaptor as claimed in claim 1 wherein said U-shaped member is a U-shaped plastic member having an end portion formed on said other end portion of the double-ended pin, and wherein each leg has a lug projecting outwardly from said leg.

5. An adaptor as claimed in claim 1 wherein said U-shaped member is a spring having a crimp in each leg at said pin to retain said member on the pin and wherein a lug is formed outwardly from each leg.

6. An adaptor for connecting a windshield wiper arm to a windshield wiper blade wherein the wiper arm has a hook end with the hook being formed by an end portion of the arm being bent back to lie parallel to said arm, said adaptor comprising a double-ended pin, a U-shaped spring member with the center of the "U" crimped onto one end portion of said double-ended pin, the legs of the "U" diverging from the crimp at the pin outward to an extent that the spacing between the ends of the "U" are farther apart than said parallel end portion of the hook is from said arm, a lug on at least one leg of said U-shaped spring member adapted to seat in a recess in one portion of the hook end of the arm, the other end portion of said pin having a slot around the outer periphery thereof whereby said other end portion of the pin may be inserted in aligned openings in a blade wherein a spring on the blade seats in said slot to retain the pin of the adaptor and the arm assembled with the blade.

* * * * *

UNITED STATES PATENT AND TRADEMARK OFFICE
CERTIFICATE OF CORRECTION

PATENT NO. : 4,214,343
DATED : July 29, 1980
INVENTOR(S) : Dennis A. Dudek

It is certified that error appears in the above-identified patent and that said Letters Patent are hereby corrected as shown below:

Column 1, line 55, "onepiece" should be --one-piece--.

Column 3, line 19, "38" should be --68--.

Signed and Sealed this

Eighteenth Day of November 1980

[SEAL]

Attest:

SIDNEY A. DIAMOND

Attesting Officer

Commissioner of Patents and Trademarks